United States Patent [19]

Hong et al.

[11] 4,182,809

[45] Jan. 8, 1980

[54] INVERSION POLYMERIZATION PROCESS FOR PRODUCING VINYL RESINS USING A DUAL LAYER COATING

[75] Inventors: Paul O. Hong, Avon Lake, Ohio; James R. Petrillo, Louisville; Teresa L. Friel, Jeffersontown, both of Ky.; Donald E. Witenhafer, North Olmstead, Ohio

[73] Assignee: The B. F. Goodrich Company, Akron, Ohio

[21] Appl. No.: 939,623

[22] Filed: Sep. 5, 1978

[51] Int. Cl.$^2$ .............................. C08F 2/18; C08F 2/32; C08F 14/06
[52] U.S. Cl. ..................................... 526/62; 526/344.2
[58] Field of Search ........................................... 526/62

[56] References Cited
U.S. PATENT DOCUMENTS

| 3,706,722 | 12/1972 | Nelson et al. | 260/85.5 ZA |
|---|---|---|---|
| 4,105,840 | 8/1978 | Cohen | 526/62 |
| 4,117,215 | 9/1978 | Witenhafer et al. | 536/62 |

Primary Examiner—Stanford M. Levin

Attorney, Agent, or Firm—Roy P. Wymbs

[57] ABSTRACT

This invention relates to a process of producing vinyl polymers or resins by an inversion polymerization technique in the presence of a dual layer coating on the internal surfaces of the polymerization reactor. By inversion polymerization is meant conducting the polymerization reaction in two stages, in the first or initial stage of which the monomer or monomers being polymerized constitute the continuous phase, and in the second or latter stage of polymerization, water constitutes the continuous phase due to the addition of sufficient water to the reactor to form said phase. The dual layer coating comprises an undercoating or primary coating of a tannin or tannate such as tannic acid or ammonium tannate, said coating being applied from an aqueous solution thereof, and a top coating comprised of a water-soluble suspending agent, such as an alkyl or an alkyl hydroxyalkyl cellulose ether, said top coating being applied from an aqueous solution thereof. By means of the present invention, polymer buildup on the internal surfaces of the reactor is substantially reduced.

18 Claims, No Drawings

INVERSION POLYMERIZATION PROCESS FOR PRODUCING VINYL RESINS USING A DUAL LAYER COATING

BACKGROUND OF THE INVENTION

In British Pat. No. 748,727 there is described an inversion polymerization process which comprises forming an initial conversion of monomer to polymer of up to 20% by mass polymerization of the monomer in the presence of a suitable catalyst. In this portion of the polymerization, the monomer is the continuous phase. Thereafter, sufficient water is added to the polymerization system to cause a phase inversion wherein the water becomes the continuous phase forming a dispersion of the unpolymerized monomer in the water. This dispersion is then polymerized to convert essentially all of the remaining monomer to solid polymer. However, the disadvantage of such a process is that polymer buildup on the internal surfaces of the reactor or "poly" is excessive and requires radical means of cleaning said surfaces after each batch or run is made, such as a high pressure stream of water, solvent cleaning, various hydraulic and mechanical reactor cleaners, and the like, and none of these has proved to be the ultimate in polymer buildup removal. Further, after several runs are made, it has often been necessary to open the reactor and manually scrape the polymer buildup off the internal surfaces. An operation such as this is not only costly, both in labor and down-time of the reactor, but presents potential health hazards as well.

In U.S. Pat. No. 3,706,722 there is described an inversion polymerization process for producing polymers having improved uniformity in porosity, size and structure. This is patentees accomplished by incorporating a nonionic, monomer-soluble surface active agent in the initial continuous monomer phase. While producing a more porous polymer, the polymer buildup is still a problem and detracts from the use of said process on a commercial basis. This is particularly true when producing polymers and copolymers of vinyl chloride where the buildup problem and health hazard is more acute than with many other monomers.

Accordingly, there is a great need to produce polymers having uniform porosity, size and structure by the inversion polymerization procedure, which procedure would substantially eliminate polymer buildup.

SUMMARY OF THE INVENTION

We have found that if the inversion polymerization process for producing vinyl resins is run in a reactor, or "poly", having the proper coating or film on the inner surfaces thereof, polymer buildup on said surfaces is substantially reduced or practically eliminated. Further, the uniform porosity, size and structure of the polymer particles, normally attained by using the inversion polymerization process, are not affected by the presence of said coating. In accordance with our invention, the inner surfaces of the reactor are first coated with an aqueous solution of a tannin or tannate, said tannin or tannate constituting the prime coating. Then a top coating being comprised of a watersoluble suspending agent, such as an alkyl or alkyl hydroxyalkyl cellulose ether. The top coating is removed or dissolved off the prime coating, and any polymer buildup thereon is removed along with it, when, in the second stage of the inversion polymerization reaction, water is the continuous phase.

DETAILED DESCRIPTION

In preparing the polymers and copolymers by the inversion polymerization process, the first stage or step comprises forming an initial continuous phase of monomer or monomers, which phase contains essentially all of the monomer or monomers to be polymerized. The monomer phase is then polymerized to a conversion of monomer(s) to a polymer or copolymer of between about 1.0% and about 20% and preferably between about 5.0% and about 12.0%. In this first stage or step the monomer or monomers are polymerized in mass or a water-in-monomer dispersion with the monomer(s) still being the continuous phase, using between about 0.1% and about 0.5% by weight, based on the weight of the monomer(s), of a monomer-soluble polymerization catalyst or initiator. Particularly useful monomer-soluble polymerization initiators are isopropyl peroxypercarbonate and lauroyl peroxide. When using the water-in-monomer dispersion, about 0.1% by weight, based on the weight of the water, of a water-soluble suspending agent is employed and the monomer(s) is uniformly mixed with at least about 0.01% by weight, and preferably between about 0.1% and about 1.0% by weight based on the weight of the monomer(s), of a monomer-soluble dispersion agent.

In the second stage of the inversion polymerization process, the water containing a suitable water-soluble suspending or dispersing agent is added to the initially or partially mass polymerized monomer(s), or to the water-in-monomer dispersion when the same is used in the first stage. The water solution can be added in any suitable manner but it is added in such an amount so as to give the desired concentration of monomer(s) for final polymerization purposes. In this second or final polymerization stage, water constitutes the continuous phase.

The monomer-soluble dispersing agents, for use in the present inversion polymerization process, are the nonionic monomer-soluble esters of fatty acids wtih glycerol, sorbitol and their polyoxyethylene derivatives and the nonionic, monomer-soluble, multi-valent metal salts of fatty acids, alkyl sulfonates and sulfates. As examples of such dispersing agents there may be named sorbitan monostearate, sorbitan tristearate, glycerol monooleate, glycerol monostearate, glycerol monopalmitate, sorbitan monooleate, and the like, calcium dilauryl sulfate, zinc dilauryl sulfate, barium distearyl sulfonate, aluminum trilauryl sulfate, and the like.

As examples or the water-soluble suspending agents are the water-soluble alkyl or hydroxyalkyl alkyl cellulose ethers wherein the alkyl group contains from 1 to 2 carbon atoms and the hydroxyalkyl groups contain from 2 to 4 carbon atoms. Any viscosity grade of the cellulose ethers may be used but it is preferred to use the lower viscosity grades, such as those having viscosity grades in the range of about 10 cps. to about 400 cps. by viscosity grade is meant the viscosity of a 2% aqueous solution of the cellulose ether measured at 20° C. The low viscosity grades of methyl cellulose and hydroxypropyl methyl cellulose are preferred cellulose ethers, since they are very easily dissolved in water. This makes for improved efficiency in commercial operations.

The monomers employed in the inversion polymerization process are the essentially water-insoluble, ethylenically unsaturated liquid monomers which form polymers which are insoluble in their monomers. Examples of such monomers are the vinyl halides; such as vinyl chloride, vinyl bromide, etc., the vinylidene halides; such as vinylidene chloride, etc., the vinyl alkanoates; such as vinyl acetate, etc.; acrylonitrile, and mixtures of said monomers. Other ethylenically unsaturated monomers may be used in admixture with the above monomers so long as such admixtures remain essentially insoluble in water and form polymers which are insoluble in their monomers. The most useful monomer in the present inversion polymerization process is vinyl chloride and the invention will be described hereinafter in connection therewith, it being understood that this is merely for simplicity of description and is not intended in a limitative sense.

As previously pointed out, in the polymerization of the monomer or monomers, in accordance with the present invention, a monomer-soluble free radical producing catalyst or initiator is employed. As examples of such catalysts there may be named di-secondary butyl peroxydicarbonate, isopropyl peroxypercarbonate, lauroyl peroxide, and the like. However, any of the known monomer-soluble catalysts may be used with which those skilled in the art are familiar. The first stage of the polymerization reaction is conducted, in the absence of oxygen, at a temperature in the range of about 25° to about 80° C. When the water-in-monomer phase is employed in the first stage, the mixture is heated with agitation, in the absence of oxygen, to a temperature of between about 25° C. and about 85° C. and preferably between about 45° C. and about 60° C. for a period of time sufficient to provide the desired conversion of monomer to polymer. When the desired conversion in the first stage has been obtained, additional water, containing the water-soluble suspending agent, is added to the reaction with sufficient vigorous agitation to form an aqueous dispersion wherein water constitutes the continuous phase. Thereafter, the aqueous dispersion is subjected to the usual polymerizing conditions of time and temperature so that the remaining liquid monomer is essentially completely converted to solid polymer. As pointed out above, usually a temperature in the range of about 30° C. to about 80° C. is sufficient with a reaction time in the range of about 2 hours to about 20 hours being required to attain the desired conversion and molecular weight.

In the practice of the present invention, the inversion polymerization process is conducted in a reactor, the internal surfaces of which have been previously coated with a water-insoluble prime coating, that is, a coating that is not removable by the aqueous polymerization medium during the second stage of the reaction, and with a water-soluble top coating applied to said prime coating. The prime coating employed in the present invention is a film or coating of a tannin or tannate which is applied to the interior surfaces of the polymerization reactor or vessel by merely contacting said surfaces with an aqueous solution of said tannin or tannate. Likewise all exposed surfaces in the interior of the reactor, such as the baffles, agitator or mixing mechanism, and the like, are also treated in like manner. The tannin coating solution is preferably sprayed on the internal surfaces of the reactor and the coating is then rinsed with water. Drying of the coating is not necessary prior to the application of the top coating.

The tannins or tannates, useful in the practice of the present invention, are those obtained by leaching and extracting wood, leaves, bark, galls, nuts and fruits of certain trees and plants, The wood, leaves, bark, etc., are usually leached with acetone and/or water and thereafter, the solution is extracted with ethyl acetate and then the ethyl acetate is evaporated. The tannins are usually identified from the source of extraction, that is, the tree or plant, for example, "chestnut tannins" which are obtained by leaching and extracting the wood of a chestnut tree.

The tannins or tannates useful in the prime coating of the instant invention are described in U.S. Pat. No. 4,105,840, issued Aug. 8, 1978. The tannins are divided into two main groups, namely, hydrolyzable tannins and condensed tannins. The hydrolyzable tannins are those in which the benzene nuclei are united in a large complex by means of oxygen atoms and can be split into simple components by acids or hydrolyzing enzymes such as tannase and emulsin. The condensed tannins are those in which the nuclei are held together by carbon linkages and they cannot be cleaved by acids and enzymes.

As examples of the hydrolyzable tannins and their source, there may be named: chinese gall or tannic acid, myrobalans tannins (nuts), valonia tannins (cups and beards), chestnut tannins (wood), divi-divitannis (pods), and the like. As examples of the condensed tannins and their source, there may be named oak tannins (bark), hemlock tannins (bark), wattle tannins (bark), sumach tannins (leaves), quebracho tannins (wood), mangrove tannins (bark), gambier tannins (leaves), and the like. Both classes of tannins work equally well in the present invention.

One of the important tannins is tannic acid which is also obtained from the extraction of oak and sumach nutgalls. Tannic acid is a lustrous, faintly yellowish, amorphous powder occurring as glistening scales or spongy mass. In addition to tannic acid, the preferred tannins are ammonium tannate and the quebracho, chestnut and wattle tannins or extracts.

The coating solutions of the tannins are on the acid side having a pH in the range of about 3.0 to about 5.0. It has been found that in the case of tannic acid, if the solution is partly neutralized with sodium hydroxide to a pH greater than 5.0, the adsorption of the coating on the surface is adversely affected and accordingly, the acid condition is preferred. On the other hand, it was found that neutralization with $NH_4OH$ is unique in that a pH of 7.0 can be employed with good to excellent adsorption. It has also been found that the inclusion in the coating solution of controlled amounts of metal ions complex with the ammonium tannate, and other natural tannins to give more resistant adsorbed coatings of the surfaces of the reactor. The inclusion of metal ions with the tannins in the coating solution is not necessary since the tannins alone will accomplish the objectives of the present invention. The use of tannins complexed with metal ions is preferred in emulsion polymerization processes since some tannin coatings are susceptible of removal by the surfactants normally employed in emulsion polymerization recipes.

Normally, demineralized water is used in making the coating solutions of tannins. Calcium and magnesium ions can be introduced into the coating solution by using controlled amounts of city or tap water in making up the coating solution. In addition, aluminum ions can be employed by the addition to the coating solution of controlled amounts of aluminum chloride. The amount of metal ions in the coating solution of the tannins will vary but usually will be in the range of about 20 ppm. to about 200 ppm. The amount of any one metal ion will vary within this range. For example, when adding tap water to the coating solution, it will contain approximately 20 ppm. of calcium and 3 ppm. of magnesium. Of course this will vary depending upon the source of tap water. The tap water to be used can be analyzed to determine the metallic content and thus determine the amount to be used in making the coating solution of the tannin.

It has been found that a concentration of tannin or tannate in the range of about 0.03% to about 5.0% by weight in water is satisfactory in accomplishing the objectives of the present invention and such coating solutions are practically colorless or only slightly amber-colored. Preferably, a concentration of tannin or tannate in water from about 0.1% to about 2.0% by weight is employed.

The top coating, which is an aqueous solution of a water-soluble suspending agent, is preferably applied over the prime coating by spraying and draining the excess solution from the reactor. It is not necessary to dry the top coating and the reactor can be charged immediately with the reaction mixture to be employed in the first stage of the inversion polymerization reaction. However, the top coating can be dried if one desires, such as by blowing a heated gas through the reactor, etc. Whether or not the top coating is dried, care must be taken to not prematurely remove the top coating by getting water under pressure directly in contact with the coated surfaces, such as by means of a pressure hose, and the like. As examples of water-soluble suspending agents, useful as a top coating in the present invention, there may be named methyl cellulose, hydroxypropyl methyl cellulose, polyvinyl alcohol, polyethylene oxide, polyvinyl pyrrolidone, and the like.

In the top coating, the suspending agent is employed in a concentration in the range of about 0.05% to about 10.0% by weight. Preferably, a concentration in the range of about 0.5% to about 5.0% by weight is used. The concentration will depend in great part upon the molecular weight of the suspending agent being employed. For example, a 2% or 3% by weight solution of hydroxypropyl methyl cellulose in water is very satisfactory.

In the first stage of the inversion polymerization process when the monomer(s) constitutes the continuous phase, the top coating is insoluble in said phase and substantially prevents the buildup of polymer on the internal surfaces of the reactor. In the second stage of the reaction, when the water constitutes the continuous phase, the top coating is dissolved off the surfaces into the reaction medium leaving the prime coating intact. If any polymer buildup has occured during the first stage, it is removed into the reaction medium when the top coating is dissolved. Surprisingly, it has been found that what little polymer buildup has occurred on the top coating during the first stage of polymerization does not adversely affect the finished polymer quality even though it is removed into the reaction medium. Any large "sandy" buildup polymer particles would, in any event, be separated when the polymer is screened after passing through the dryer.

The prime coating and top coating solutions of the present invention are made by conventional methods, using heat and agitation where necessary. When using a tannin or tannate it is dissolved in water to an extent such that the solids content of the coating solution does not prevent it from being sprayed on the inner surfaces of the reactor through appropriate spray nozzles. Usually a coating solution having a solids content of coating material in the range of about 0.1% to about 20.0% by weight is satisfactory. However, since the solids content depends upon the molecular weight of the particular material being used, it could, in certain instances, be greater than 20.0% or less than 0.1% by weight.

In order to further illustrate the present invention, the following specific examples are given. It is to be understood, however, that this is merely intended in an illustrative and not in a limitative sense. In the examples, all parts and percents are by weight, unless otherwise indicated.

EXAMPLE I

In this Example, several different tannins were employed in coating the reactor surfaces with a prime coating. The results are tabulated below. A polymerization was run in an uncoated reactor for the purpose of a control. In each case, the tannin was dissolved in demineralized water to give a 1% solution. The internal surfaces of the reactor were coated with each coating solution by spraying through nozzles mounted on the reactor and thereafter each coating was rinsed with tap water. Thereafter, the internal surfaces of the reactor, having the prime coating thereon, were coated with a 3% aqueous solution of hydroxypropyl methyl cellulose and allowed to drain. In each case the excess coating solution was removed from the reactor. After coating of the reactors, the following polymerization was run in each case, including the control, or uncoated reactor: first, 0.68 part of sorbitan monostearate, based on 100 parts of monomer, was charged to the reactor. Then 0.10 part per hundred parts of monomer of a 20% solution of di-secondary butyl peroxydicarbonate in hexane was charged to the reactor. The reactor was then evacuated to 27 inches of mercury. Then 100 parts of vinyl chloride were added. The reactor contents were then heated to 52° C. at about 120 psig. pressure. Then 40 parts of demineralized water containing 0.04 part hydroxypropyl methyl cellulose were added over a period of 15 minutes with agitation in a manner to avoid direct contact with the wall. The first stage polymerization was then continued with agitation for a period of one hour or to a conversion of monomer to polymer or approximately 8%.

After the completion of the first stage polymerization, 160 parts of demineralized water containing 0.16 part of hydroxypropyl methyl cellulose were metered into the reactor over a period of one hour. Thereafter, the polymerization reaction was continued in the second stage with water being the continuous phase until the pressure in the reactor reached 90 psig. This resulted in a total conversion of monomer to polymer of about 85%. The polymer was then removed and dried in the usual manner. Thereafter, the reactor surfaces were examined in each case and the results are tabulated in the following table:

TABLE I

| | Coating Material | Buildup Condition |
|---|---|---|
| 1. | Control (No coating) | Sandy and Paper Buildup |
| 2. | Tannic Acid | CLEAN - Some removable sandy spots |
| 3. | Chestnut Tannin | CLEAN - Some removable sandy spots |
| 4. | Quebracho Tannin | CLEAN - Some re- |

TABLE I-continued

| | Coating Material | Buildup Condition |
|---|---|---|
| 5. | Wattle Tannin | movable sandy spots CLEAN - Some removable sandy spots |

In each case, where a tannin was employed as the prime coating, the surfaces were substantially free of polymer buildup. Further, the polymers produced in the coated reactors were of a large and uniform particle size and had high porosity, as evidenced by their ability to readily absorb plasticizer.

Coating of the internal surfaces of the polymerization reactor with a prime coating and a top coating, in accordance with the present invention, for use with the inversion polymerization process, substantially reduces polymer buildup on said surfaces. This results in increased production over a unit period of time. The polymer buildup, if any, in the first stage or wherein the monomer is the continuous phase is removed into the reaction medium by dissolution of the top coating and in those instances where a little polymer buildup does accumulate on the interior surfaces during the second stage, it is not of the hard, rough difficult-to-remove type and is easily removed without employing the difficult and tedious scraping methods that have heretofore been necessary in the art. Further, the polymers produced in accordance with the present invention are of a highly uniform size, shape and porosity. These polymers have improved bulk density, low gel content and good flow characteristics. The polymer particles are capable of enhanced, uniform, plasticizer absorption. Numerous other advantages of the present invention will be apparent to those skilled in the art.

While the present invention has been described in terms of its specific embodiments, certain modifications and equivalents will be apparent to those skilled in the art and are intended to be included within the scope of the invention, which is to be limited only by the scope of the appended claims.

We claim:

1. In a process of inversion polymerizing substantially water-insoluble polymerizable ethylenically unsaturated monomer(s) in a reaction vessel by first forming a continuous monomer(s) phase in the presence of a monomer-soluble surface active agent and a monomer-soluble catalyst, polymerizing said monomer phase at a temperature in the range of about 25° C. to about 85° C. until a conversion to polymer less than about 20% occurs, adding sufficient water to the monomerpolymer mixture with agitation and in the presence of at least about 0.1% by weight of a water-soluble suspending agent for said monomer(s) to form a dispersion wherein water is the continous phase, then polymerizing said dispersion at a temperature in the range of about 30° C. to about 80° C. to convert the remaining monomer(s) to polymer, the improvement which comprises (1) applying a prime coating to the internal surfaces of said reaction vessel, said prime coating comprising a tannin selected from the group consisting of hydrolyzable tannins, condensed tannins, ammonium tannates and tannins complexed with metal ions, (2) applying to said prime coating a top coating of a water-soluble suspending agent, (3) polymerizing the continuous monomer(s) phase in contact with said top coating, and (4) polymerizing said continuous water phase in contact with said prime coating after dissolving siad top coating in the continuous water phase, whereby polymer buildup on said internal surfaces is substantially eliminated.

2. A process as defined in claim 1 wherein the monomer is vinyl chloride.

3. A process as defined in claim 1 wherein the tannin is tannic acid.

4. A process as defined in claim 1 wherein the tannin is chestnut tannin.

5. A process as defined in claim 1 wherein the tannin is quebracho tannin.

6. A process as defined in claim 1 wherein the tannin is wattle tannin.

7. A process as defined in claim 1 wherein the continuous monomer phase is a water-in-monomer dispersion.

8. A process as defined in claim 1 wherein the top coating is an alkyl hydroxyalkyl cellulose ether.

9. A process as defined in claim 1 wherein the monomer-soluble surface active agent is selected from the group consisting of nonionic esters of fatty acids with glycerol, sorbitol and their polyoxyethylene derivatives and nonionic multi-valent salts of fatty acids, alkyl sulfonates and sulfates.

10. A process as defined in claim 1 wherein the top coating is hydroxypropyl methyl cellulose.

11. A process as defined in claim 3 wherein the monomer is vinyl chloride.

12. A process as defined in claim 11 wherein the continuous monomer phase is a water-in-monomer dispersion.

13. A process as defined in claim 12 wherein the top coating is hydroxypropyl methyl cellulose.

14. A process as defined in claim 13 wherein the monomer-soluble surface active agent is sorbitan monostearate.

15. A process as defined in claim 1 wherein the tannin is dissolved in water to give a concentration in the range of about 0.03% to about 5.0% by weight of tannin prior to application to the internal surfaces of said reaction vessel.

16. A process as defined in claim 15 wherein the top coating is made by dissolving the water-soluble suspending agent in water to give a concentration in the range of about 0.05% to about 10.0% by weight prior to application to the prime coating.

17. A process as defined in claim 16 wherein the monomer is vinyl chloride.

18. A process as defined in claim 1 wherein the monomers are vinyl chloride and vinyl acetate.

* * * * *